United States Patent
Crinion et al.

(10) Patent No.: US 6,181,699 B1
(45) Date of Patent: Jan. 30, 2001

(54) APPARATUS AND METHOD OF ASSIGNING VLAN TAGS

(75) Inventors: Patrick T. Crinion, San Jose; Vickie Pagnon, Sunnyvale, both of CA (US)

(73) Assignee: National Semiconductor Corporation, Santa Clara, CA (US)

( * ) Notice: Under 35 U.S.C. 154(b), the term of this patent shall be extended for 0 days.

(21) Appl. No.: 09/108,873

(22) Filed: Jul. 1, 1998

(51) Int. Cl.$^7$ .................................................. H04L 12/56

(52) U.S. Cl. ................................. 370/392; 370/389

(58) Field of Search ................................. 370/389, 395, 370/401, 428, 470, 400, 392; 711/216, 217, 218

(56) References Cited

U.S. PATENT DOCUMENTS

| | | | |
|---|---|---|---|
| 5,852,607 | * 12/1998 | Chin ........................ | 370/401 |
| 5,930,254 | * 7/2000 | Liron et al. ................ | 370/395 |
| 5,956,335 | * 9/1999 | Backes et al. ............. | 370/392 |
| 5,959,990 | * 9/1999 | Frantz et al. .............. | 370/392 |
| 6,016,308 | * 1/2000 | Crayford et al. .......... | 370/252 |
| 6,018,526 | * 1/2000 | Liu et al. .................... | 370/401 |

OTHER PUBLICATIONS

The Virtual LAN Technology Report, May 1996.
"P802.1Q/D7" of Oct. 3, 1997, IEEE. (Please note specifically pp. 52–54, 73–80, Appendix C—pp. 156–182 and 183–186).

* cited by examiner

Primary Examiner—Douglas W. Olms
Assistant Examiner—Ken Vanderpuye
(74) Attorney, Agent, or Firm—Limbach & Limbach L.L.P.

(57) ABSTRACT

An apparatus for and method of assigning a VLAN tag to a frame received at a port of a switch are disclosed. The apparatus includes a content addressable memory, a data frame memory, a search circuit, and a tagging circuit. The content addressable memory stores tagging information, the tagging information including lookup data and associated tag data. The frame memory stores at least part of a data frame, the part including data frame information. The search circuit is connected to the content addressable memory and the data frame memory. The search circuit reads the data frame information, searches the content addressable memory for the lookup data corresponding to the data frame information, and reads a corresponding subset of the associated tag data. The tagging circuit is connected to the search circuit and the data frame memory. The tagging circuit writes in the data frame memory a VLAN tag including the corresponding subset of the associated tag data.

16 Claims, 7 Drawing Sheets

| VLAN ID | VALID | PRIORITY | VALID | ACTIVITY |
|---|---|---|---|---|

Tag

APPARATUS AND METHOD OF ASSIGNING VLAN TAGS

BACKGROUND OF THE INVENTION

1. Field of the Invention

The present invention relates to data switches that route data frames to ports based on tagging information in the packets. In particular, the invention relates to circuits which assign default tags to data frames.

2. Description of the Related Art

Local area networks (LANs) of all types that are IEEE 802 compliant may be connected together with media access control (MAC) bridges, as specified in ISO/IEC 10038, as modified by supplement P802.1p. The IEEE 802.1Q standard defines the operation of virtual LAN (VLAN) bridges that permit the definition, operation, and administration of VLAN topologies within a bridged LAN infrastructure.

Within 802.1 Q, data frames are routed between ports of the VLAN according to VLAN tags. If a frame does not contain a VLAN tag, a default tag may be assigned to it based on the port on which the frame was received.

However, this assignment of the default tag fails to account for other information in the frame which may be used to more intelligently assign a default tag. A frame may contain information such as a source address, a destination address, and protocol information which provide more information than just the port at which the frame was received. There is a need for an apparatus and a method of assigning a default tag which accounts for this additional information.

In addition, IEEE 802.1Q does not enable the assignment of a priority level to untagged frames when assigning the default tag, nor enable an assigned priority level to be changed. There is a need for an apparatus and a method of assigning and changing priority levels.

Finally, it would be advantageous if the circuitry solving both these deficiencies included a number of common functional blocks. Such commonality would allow functions to be performed with the same circuitry, reducing the total number of circuits required.

SUMMARY OF THE INVENTION

The present invention addresses these and other problems of the prior art by providing a circuit for assigning VLAN tags based on data frame information in addition to the port on which the data frame was received. Common parts of the circuit may also be used to assign a priority level to untagged data frames or to change an assigned priority level.

According to one embodiment, an apparatus according to the present invention includes a circuit for assigning a VLAN tag to a data frame received at a port of a switch. The circuit includes a content addressable memory, a data frame memory, a search circuit, and a tagging circuit. The content addressable memory stores tagging information, the tagging information including lookup data and associated tag data. The data frame memory stores at least part of a data frame, the part including data frame information. The search circuit is connected to the content addressable memory and the data frame memory. The search circuit reads the data frame information, searches the content addressable memory for the lookup data corresponding to the data frame information, and reads a corresponding subset of the associated tag data. The tagging circuit is connected to the search circuit and the data frame memory. The tagging circuit writes in the data frame memory a VLAN tag including the corresponding subset of the associated tag data.

According to another embodiment, a method according to the present invention assigns a VLAN tag to a data frame received at a port of a switch. The method includes the steps of storing tagging information (including lookup data and associated tag data), storing at least part of a data frame (including data frame information), reading the data frame information, searching the tagging information for the lookup data corresponding to the data frame information, reading a subset of the associated tag data according to a result of the step of searching, and writing in the part a VLAN tag including the subset of the associated tag data.

DETAILED DESCRIPTION OF THE PREFERRED EMBODIMENTS

General Description of a Preferred Embodiment

Figure 1:
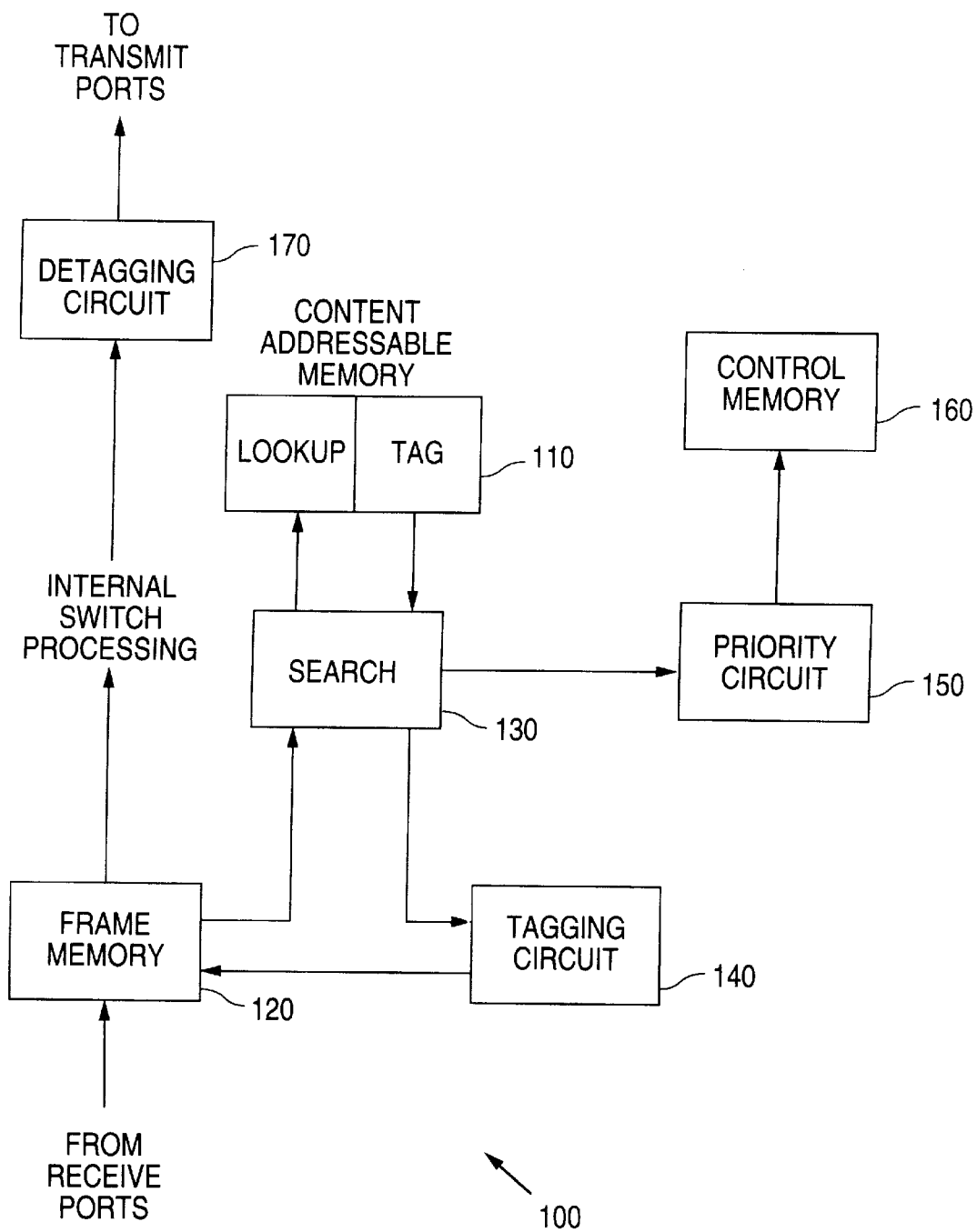
FIG. 1 is a block diagram of a circuit implementing one embodiment of the present invention.

FIG. 1 shows the functional blocks of a circuit 100 implementing one embodiment of the present invention. The circuit includes a content addressable memory 110, a frame memory 120, a search circuit 130, a tagging circuit 140, a priority circuit 150, a control memory 160, and a detagging circuit 170. Circuit 100 is implemented as part of a data switch which sends and receives data frames.

Circuit 100 may be implemented using any integrated circuit process as is known in the art. Preferably circuit 100 is implemented to operate at 3.3 V.

Content addressable memory 110 stores tagging part of which is to be inserted into frames to enable VLAN functionality. Content addressable memory 110 may also store priority information. The tagging information and priority information are collectively referred to as tag data. The tagging information also includes lookup data which is associated with the tag data. Preferably each set of lookup data is unique and corresponds to one set of tag data.

According to IEEE 802.1Q, the default tag is assigned to a frame based on the port at which the frame has been received. This assignment method may be implemented in content addressable memory 110 by storing port identifiers as the lookup data. Thus, circuit 100 is able to assign default tags based on IEEE 802.1Q defaults as well as the other ways described below.

Content addressable memory 110 may be updated with new information, preferably by management software.

Figure 2:
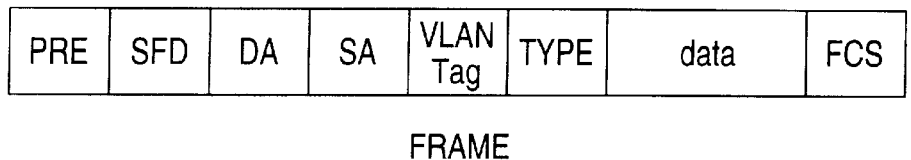
FIG. 2 is a data field showing the data components of an Ethernet frame.

Frame memory 120 stores at least part of a frame which has been received at a port of the switch. The frame part includes frame information. An exemplary frame is shown in FIG. 2.

Search circuit 130 reads the frame information from frame memory 120 and then searches for the frame information in the lookup data. Once it has located the frame information, search circuit 130 reads the corresponding tag data. The corresponding tag data includes a VLAN tag to be inserted into the frame. The corresponding tag data may also include internal priority information.

Figure 3:
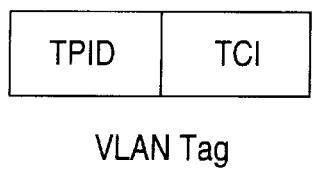
FIG. 3 is a data field showing the data components of a VLAN tag.

Tagging circuit 140 writes the VLAN tag into the frame stored in frame memory 120. An exemplary VLAN tag is shown in FIG. 3.

Control memory 160 stores an information word that is used to control various operations of the switch, including setting the internal priority of frames. This internal priority may be distinct from the priority information carried in the frame by the VLAN tag (shown in FIG. 4). In a preferred embodiment, the internal priority is represented by a single bit.

Priority circuit 150 writes the internal priority information located by search circuit 130 into control memory 160.

Detagging circuit 170 removes the tag inserted by tagging circuit 140 before the frame is sent to the transmit ports for transmission to other receive ports.

Briefly, circuit 100 operates as follows. The witch receives a frame. Frame memory 120 stores the frame. If the frame lacks a tag, or if tag replacement is desired, search circuit 130 searches the lookup data in content addressable memory 110 for the frame information. Once it has located the frame information, search circuit 130 reads the associated tag data. Tagging circuit 140 inserts a desired portion of the tag data into the frame in frame memory 120. Frame memory 120 then sends the frame for internal processing by the switch. Finally, before the frame is forwarded to other switches, detagging circuit 170 removes the inserted tag, if desired. The frame is then sent to the transmit ports of the switch.

Circuit 100 may also control the internal priority of the frame. To do so, content addressable memory 110 also contains priority information. Search circuit 130 searches the lookup data as above, and reads the associated tag data. Priority circuit 150 reads the internal priority information from the tag data, and writes it into control memory 160.

FIG. 2 illustrates an exemplary frame. The frame includes seven bytes of preamble information (PRE), one byte of start-of-frame delimiter information (SFD), six bytes of destination address information (DA), six bytes of source address information (SA), four bytes of VLAN tag information, two bytes of protocol information (TYPE), and four bytes of Frame Check Sequence information (FCS). The above comprise the frame information. The frame also contains a number of bytes of data. The number of bytes of data is limited by the maximum frame size, which is determined by the data transmission standard the switch is operating under.

FIG. 3 illustrates an exemplary VLAN tag. The VLAN tag includes two bytes of Tag Protocol Identifier (TPID) and two bytes of Tag Control Information (TCI).

Figure 4:
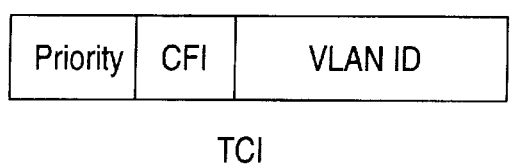
FIG. 4 is a data field showing the data components of the Tag Control Information.

FIG. 4 illustrates an exemplary TCI. The TCI includes three bits of priority information, one bit of Canonical Format Indicator (CFI), and 12 bits of VLAN ID. The priority information is defined by IEEE P802.1p. The CFI bit indicates whether the Routing Information Field (RIF) is present in the Tag Header, and whether the MAC data carried by the frame is in Canonical format.

Figure 5:
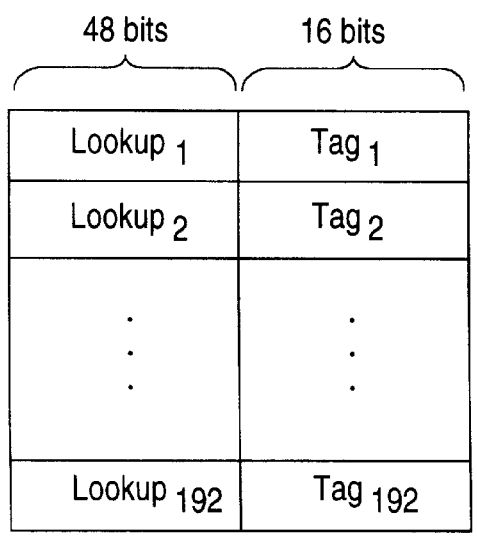
FIG. 5 is a data array showing the arrangement of data in the content addressable memory.

In a preferred embodiment, as shown in FIG. 5, the lookup data in content addressable memory 110 are each 48 bits and contain a collection of destination addresses. Thus, the frame information read by search circuit 130 is the frame's destination address. Optionally, the lookup data contain a collection of 32-bit hashes of the source address and the destination address, and either 16 zeros or the 16bit TYPE field, which totals 48 bits. These implementations of the lookup data are more fully discussed below.

Figures 6, 7:
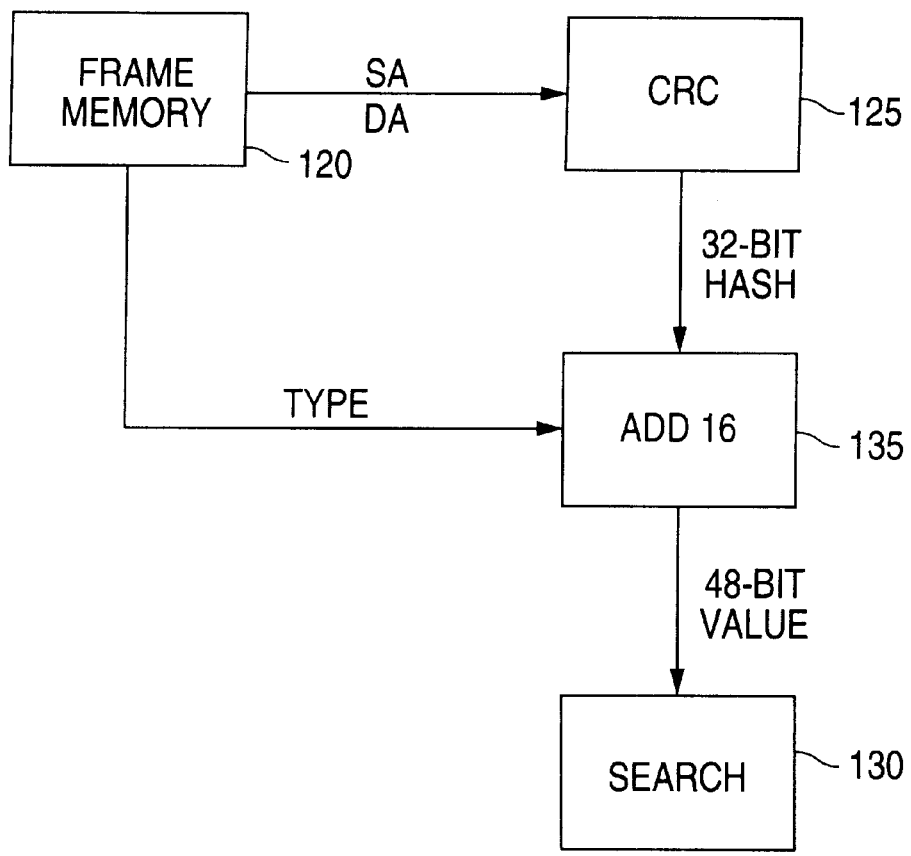
FIG. 6 is a data field showing the data components of the tag data in the content addressable memory.
FIG. 7 is a block diagram showing hash circuitry that may be added to FIG. 1.

As also shown in FIG. 5, the tag data in content addressable memory 110 are each 16 bits. FIG. 6 shows that the tag data include a 12-bit VLAN ID, a VALID bit for the VLAN ID, a one-bit PRIORITY flag, a VALID bit for the PRIORITY, and a one-bit ACTIVITY flag.

FIG. 7 shows circuitry which may be added to FIG. 1 to perform a search based on more frame information than the destination address. FIG. 7 shows a CRC circuit 125 and an addition circuit 135 between frame memory 120 and search circuit 130.

The CRC circuit 125 may be the same CRC circuit that is used for error-checking in other parts of the switch. In a preferred embodiment, CRC circuit 125 generates a 32-bit CRC.

Because the lookup data is preferably 48 bits, the 32 bits from CRC circuit 125 may be augmented with 16 more bits for a common bit-count lookup. Addition circuit 135 preferably adds either the 16-bit TYPE field or 16 zeros to the 32-bit hash to create a 48-bit value to locate in the content addressable memory.

The circuit blocks shown in FIG. 7 operate as follows. Frame memory 120 operates as described above in connection with FIG. 1. The CRC circuit 125 reads the frame information. Preferably the frame information read is the source address and the destination address. The CRC circuit 125 generates a 32-bit hash. Addition circuit reads the 32-bit hash and conforms it to the lookup data in content addressable memory 110, preferably by reading the TYPE frame information or by adding 16 zeros. Search circuit 130 then uses the resulting 48-bit value for searching content addressable memory 110.

In a preferred embodiment, the invention of the present application is implemented as a component of the DP83890 Private Data Exchanger (PDX) Ethernet switch from National Semiconductor Corp., Santa Clara, California.

General Overview of DP83890 PDX The DP83890 PDX is an integrated 13-port switching solution. The PDX allows 10/100 Mbps half- and full-duplex switched Ethernet at a cost point attractive for desktop connectivity. A complete stackable desktop switching solution with uplinks to existing switched networks is provided by the PDX. The PDX integrates a reduced MII interface on 12 ports, enabling connection to National Semiconductor's Multi-Port 10BASE-T/100BASE-TX physical layer protocol/physical medium dependent (PHY/PMD) integrated circuits. In addition, one full MII interface port (which is capable of supporting a fiber transceiver), is provided, and port 12 is capable of switching between full MII and reduced MII. The inclusion of the 13th port on the PDX gives the system designer the flexibility to create a stand-alone 12/24 port switch or up to a six-box stacked system with 26 ports per box (156 total ports). The 2.4 Gb/s switch bus allows for a simple and inexpensive stackable interface via SCSI ribbon cable. Since the signaling across the stack bus utilizes a differential low voltage swing technology, the EMI performance of the entire stack is improved. The switch bus also allows for bus oversubscription without packet loss.

The reduced MII may connect to external PHY and PMD or 10 Mbps and 100 Mbps 802.3 Ethernet. The twisted pair 10/100 Mbps common drivers with integrated filters requires only a single transformer and termination for external connection to the twisted pair. The compliant ANSI X3T12 TP-PMD includes adaptive equalization and baseline wander compensation.

The buffer manager (BM) accepts data from the switch us and buffers it to external DRAM. The queue manager also reassembles the packets and loads the appropriate port's transmit first-in first-out (FIFO) so the packet can be transmitted. This interface also includes all the logic and drivers required for DRAM refresh.

Figure 8:
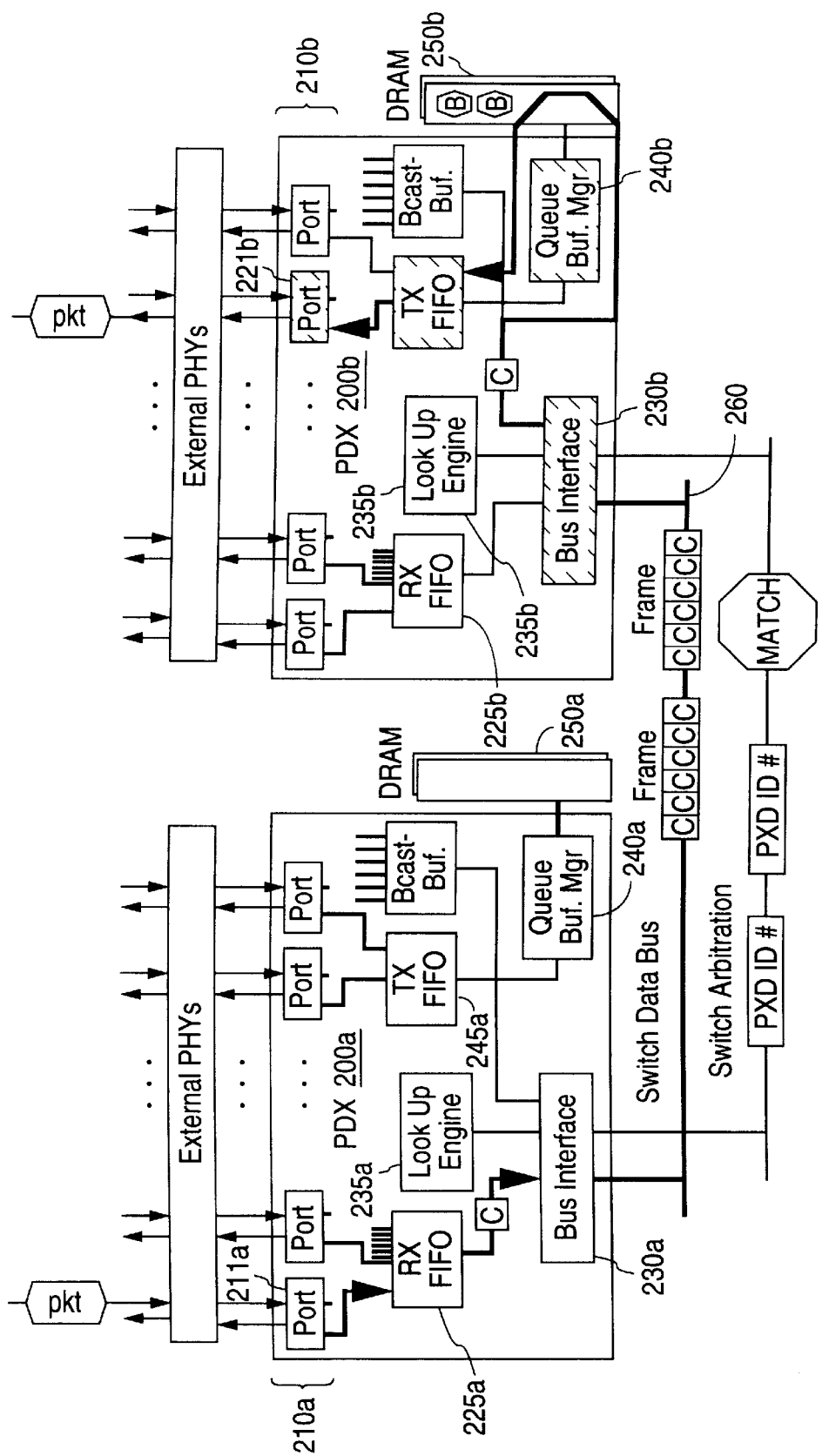
FIG. 8 is a block diagram of two data switches in which are implemented preferred embodiments of the present invention.

The DP83890 PDX includes several functional blocks that perform high speed routing of packets between various ports. FIG. 8 shows two DP83890 switches 200a and 200b and their functional blocks. These blocks include (for each switch "a" and "b") a port block 210, a receive (RX) FIFO block 225, a switch bus interface block 230, a look-up engine (LUE) block 235, a buffer manager block 240, a transmit (TX) FIFO block 245, and a management information base (MIB) engine block (not shown).

Port block 210 contains the IEEE 802.3 media access control (MAC) for both transmission and reception of Ethernet frame data. The DP83890 has 12 ports numbered 211 through 222.

The RX FIFO 225 is a packet buffer which provides temporary storage of frame data prior to sending data over the switch bus. It can store up to 2K bytes.

Switch bus interface 230 transfers data from RX FIFO 225 and sends it across the bus connecting multiple PDXs. Switch bus interface 230 also reads data off the bus and hands the headers to the look up engine to determine whether to accept the frame.

Look up engine 235 looks up destination addressing, information field data, and VLAN information to determine whether to accept a cell and to determine what buffer manager 240 should do with the cell.

Buffer manager 240 takes data from the bus interface and routing information from look up engine 235 to store information in DRAM 250. The DRAM 250 is preferably SDRAM located external to the switch. Buffer manager 240 also manages a series of queues for storage of frames on temporarily congested ports, and tracks free memory usage.

The TX FIFO 245 includes three types of transmit FIFOs which move the data from DRAM 250 to the transmit portion of the port block. The three sets of FIFOs are: (1) 13 Unicast FIFOs; (2) a Broadcast FIFO; (3) a second Broadcast FIFO.

The MIB Engine (not shown) interfaces to most of the other blocks to track network management statistics by maintaining a set of counters compliant to the various networking MIB standards.

FIG. 8 illustrates the data path of a packet as it traverses through PDX 200a, across switch data bus 260, and out of PDX 200b.

A good overview of the operation of the PDX system is to follow the transmission of a unicast packet. To start, a packet is received on port 211a of PDX 200a. The external PHY/PMD device converts the network encoded data (Manchester encoded for 10 Mb/s and MLT3 encoded for 100 Mb/s) to nibble-wide NRZ format that is passed to port block 210a for port 211a. This block contains the Ethernet Media Access Control (MAC) function. The port's receive section monitors the incoming data. It first looks for a Start of Frame Delimiter (SFD), and then (depending on mode enabled) checks the packet for VLAN tag, and PAUSE frame. As further described below, a frame may be processed by an internal receive CAM which can assign a VLAN tag to frames based upon source address (SA), destination address (DA), or protocol information (such as the TYPE field). The data is then framed into 40-bit cells and passed to receive FIFO 225a. At the end of the reception, assuming the packet is a simple unicast packet, the byte count and any errors are sent to the MIB.

As the reception process in port block 210a continues, data is loaded into RX FIFO 225a. When the data in RX FIFO 225a reaches the drain threshold, the PDX will arbitrate for access to switch bus 260 by asserting REQ and its unique PDX_ID onto bus 260 in order to become the bus master. If it wins the arbitration it can now source data across switch bus 260.

The protocol for sending data across switch bus 260 is to first send an information (Info) field word followed by data words. If the PDX mastering switch bus 260 has more than one port whose RX FIFO drain threshold has been met, then it will source consecutive Info/data cells. The process of switch bus arbitration and the sending of Info/data cells will continue until the entire packet from RX FIFO 225a has been emptied.

As the first cell from port 211a is sent across switch bus 260, all PDXs will monitor the data received from the switch bus. When the first Info/data cell of the packet is received by PDX 200b, the DA field of the packet is parsed by look up engine 235b which compares his address with those stored in its internal CAM. In this case, it is assumed that the CAM matches, indicating that port 221b is the intended destination. With an address match, PDX 200b will source a destination MATCH signal back to PDX 200a to indicate that the packet's destination has been found.

Once a DA match occurs, buffer manager 240b will assign a packet buffer (in DRAM 250b) to the newly received packet. This buffer is large enough so that it will store contiguously the entire packet in memory. As more of the cells from port 211a are received, buffer manager 240b assembles the packet data from switch bus 260, and buffer manager 24b will continue to fill the assigned packet buffer. When the packet buffer's drain threshold has been reached (which depends upon the forwarding mode of the port: cut-thru, run-free, or Store-n-Forward mode), the data is passed from the assigned buffer to transmit FIFO 245b.

The transmit portion of port block 210b will convert the 48-bit wide data from the TX FIFO 245b to nibble-wide data for the MII of the physical layer. The transmit portion of port block 210b also implements the 802.3 and various proprietary Ethernet MAC protocols. At the end of sending the frame, port block 210b will signal the transmit statistics to the MIB engine.

As nibble-wide data from the transmit Port Block is received by the PHY/PMD, it will transmit the packet in compliance with the 10 Mb/s or 100 Mb/s specification.

Broadcast or multicast frames have a similar data flow. The difference is that buffer manager 240 will place the frame on the broadcast queue. This queue feeds frame data to the 10 Mb/s and 100 Mb/s Broadcast FIFOs. Both FIFOs are a full packet buffer in size, and feed all 13 ports. The frame in this FIFO is sent to all idle ports, and to non-idle ports once their current transmission is complete.

Port Block

Figure 9:
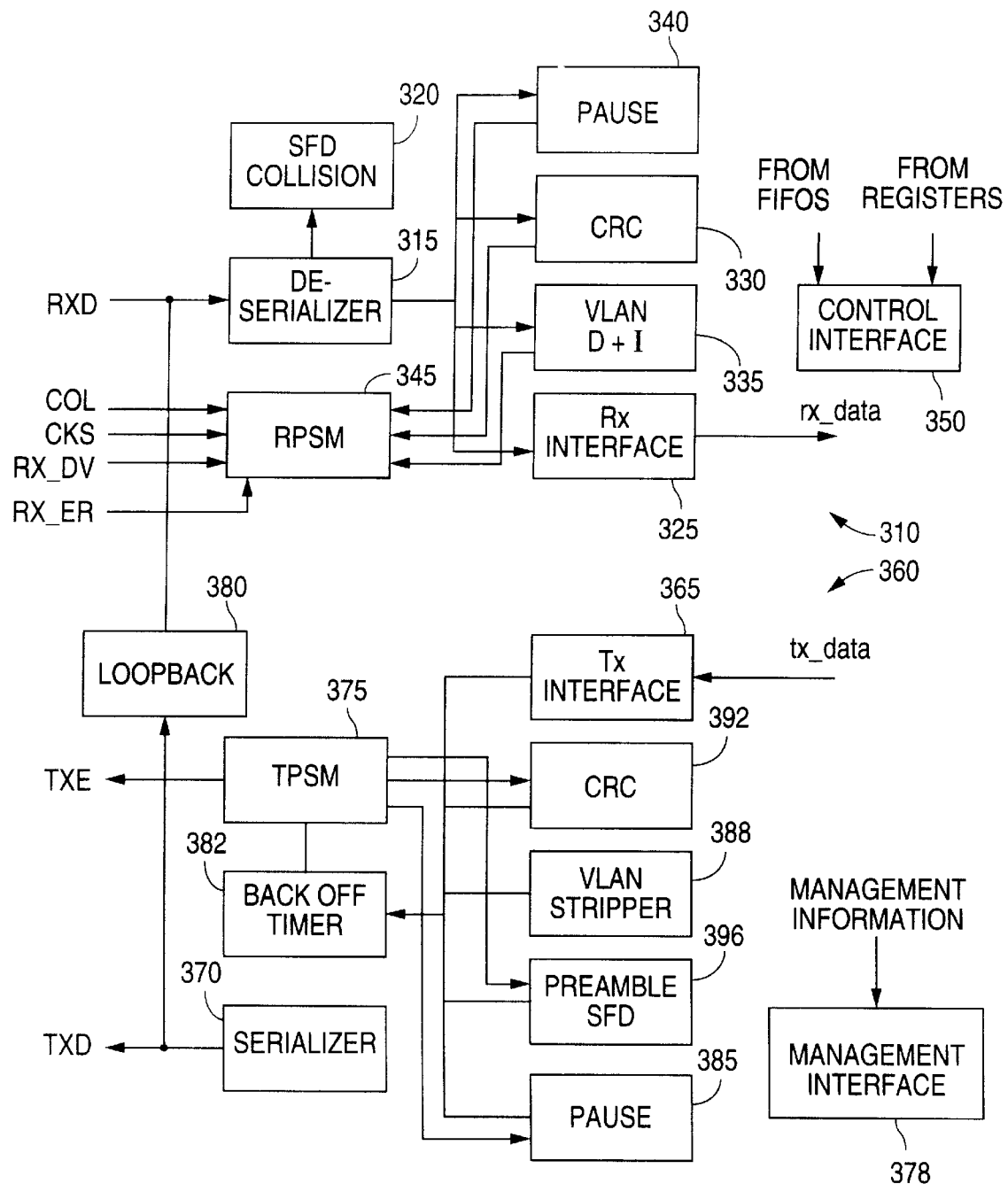
FIG. 9 is a block diagram of a port block in the data switch.

FIG. 9 shows port block 210, which implements the MAC layer protocol required to interface the PDX to 10 Mb/s or 100 Mb/s Physical Layer ENDEC blocks. During transmission, port block 210 frames the information from the transmission FIFO and supplies data to the PHY. During reception, the incoming information from the PHYs is deserialized, the frame monitored, and the data transferred to the receive FIFO. Additionally, port block 210 generates pause frames, detects and responds to pause frames, extracts VLAN packet tags, detects and inserts VLAN packet tags, and responds to flow control conditions. Control and status registers govern the operation of port block 210.

Port block 210 is divided into two sections, a receive section 310 and a transmit section 360.

Receive section 310 controls the MAC receive operations during reception, loopback and transmission (half duplex). It contains the control logic for the reception of normal data frames and PAUSE frames in nibble wide format from the internal MII interface. It receives a number of data and control signals, including control signals from the FIFOS, mode setting signals from the registers, a COL signal, a CRS signal, a RX_DV signal, a RX_ER signal, a four-bit RXD signal, and signals from the transmit protocol state machine 345. Receive section 310 generates a 48-bit rx_data signal and signals to the transmit protocol state machine 345.

During a reception, deserializer 315 becomes active after SFD/collision detector 320 detects the Start-of-Frame-Delimiter (SFD). Deserializer 315 then frames the data into a 48-bit wide format to be sent onto the switch bus through the receive FIFO via interface to RX 325. At the end of packet reception, CRC checker 330 checks the data for errors (CRC, FAE, length errors). If any of the previously mentioned errors occur, a "discard" bit in the information field for the packet is set so that buffer manager 240 of the destination PDX can filter the packet (store-n-forward mode). In cut-thru mode, the packet is forwarded regardless of packet error, but the CRC that is appended by the PDX will be erroneous.

Receive section 310 has the capability of VLAN tag detection with VLAN detector/inserter 335, which implements the IEEE 802.1Q default tag insertion scheme. Detector/inserter 335 compares the type field of the incoming frame to the VLAN type ID. If a match occurs, a VLAN tagged packet has been received and the PDX will set the Rx packet status bits in the info field. If the insert tag function is enabled, circuit 100 will insert the VLAN tag (assigned to the port) on an untagged received packet before sending the data on to RX FIFO 225. If a tagged frame is detected and the port is set to accept only untagged frames, then the frame will be discarded. Similarly, if an untagged frame is received on a port that is configured to accept tagged frames only, then the frame will be discarded. Also, if the received packet's VLAN identifier is set to "null", detector/inserter 335 will overwrite the identifier with the port's default ID.

Detector/inserter 335 also checks the DA field of the incoming packets for broadcast and multicast packets and passes this information to the RX FIFO and status information to the MIB Engine for logging of MIB counter statistics.

Detector/inserter 335 also detects the priority for PACE frames by monitoring the address field of the received packet.

NOTE: The PACE algorithm is a proprietary protocol developed by 3Com Corporation. To use this algorithm a manufacturer must obtain a license from 3Com. Once the manufacturer is licensed details of the operation and usage of PACE will be provided. PACE is a registered trademark of 3Com Corporation.

Detector/inserter 335 also processes the priority for VLANs. Priority for VLANs is supported in two different modes. In the first mode, the priority bits in a VLAN frame (see FIG. 4) are compared against the priority register (three bits for each port). Whenever the VLAN priority is higher than the register bit contents, the frame is marked as a high priority frame. In the second mode the incoming VLAN priority bits are compared against the priority register whose bits are specified in the VLAN Priority Mask register and if the MASK value matches, then VLAN priority is set. Priority is given to all multicasts received if EN_MCAST_PRI bit is set, in Port Control register 3.

PAUSE frame detector 340 monitors incoming packets for PAUSE frames.

Receive protocol state machine 345 may take various states in response to different conditions of receive section 310.

Control interface 350 receives various control signals.

Transmit section 360 contains the necessary logic to transmit normal data frames in compliance with IEEE 802.3 MAC protocol for both full and half duplex modes. In addition, it responds to flow control algorithms that are used to manage the resources of DRAM 250 and switch bus 260. It receives various control and data signals, including management signals, a 48-bit tx_data signal, and control signals from the receive protocol state machine 345. Transmit section 360 generates a TXE signal, a four-bit TXD signal, and control signals to the receive protocol state machine 345.

During data transfers, transmit section 360 accepts data from the TX FIFO via interface 365 in six-byte format, and serializer 370 converts it to nibble-wide data for transmission to the MII interface. Transmit section 360 will be allocated to the beginning of the packet prior to the preamble and SFD and will ensure a correct CRC is transmitted.

Transmit protocol state machine 375 implements a number of MAC protocol algorithms, including standard 802.3 MAC, PACE Mode, PDX MAC Algorithm, and PDX Aggressive Algorithm.

Loopback circuit 380 supports per port diagnostic loopback much like a standard MAC supports loopback.

Back off timer 382 generates a random backoff time interval if a set number of consecutive collisions occurs.

The PAUSE frame generator 385 manages the generation of PAUSE frames for flow control in full duplex mode.

The VLAN stripper 388 removes a VLAN tag inserted by receive section 310. The VLAN stripper 388 corresponds to detagging circuit 170.

The CRC generator 392 generates a CRC. This may be the same as CRC circuit 125.

Preamble/SFD generator 396 generates a preamble and an SFD.

Management interface 378 receives various control signals.

Uplink Ports

Uplink ports are defined as ports designated to be connected to the upper level network. These ports provide a means of connecting PDX to the rest of an enterprise network with potential to configure multiple ports for enhanced network performance.

The PDX will forward a packet to the upper level network through an uplink port when the packet's destination address is not matched within the PDX stack, or when it is a broadcast or multicast packet originating within PDX and VLANs are not enabled.

Any PDX port may be configured to be an uplink port. The configuration is controlled by programming the UPLINK bit in the Port Configuration Register 0, as follows:

| UPLINK | Configuration |
|--------|---------------|
| 0 | Port is not an uplink |
| 1 | Port is an uplink |

The PDX uplink schemes provide for multiple uplinks per stack. This allows increased bandwidth to the upper level network, as some downlink ports can be allocated to one uplink and other downlinks to another uplink.

PDX can be configured with either of two uplink schemes.

The default mode uses VLAN membership to associate a given downlink port to an uplink port. Multiple uplinks can be specified per VLAN; however, the spanning tree will reduce the redundant uplinks to only one. This implies one active uplink port per VLAN. All packets received on a given port are sent to the same uplink port. If the PDX was not configured for VLANs, there would be one uplink port for the whole stack.

Optionally, if the stack is not configured for VLANs, PDX has a mode in which frames are sent to uplink ports based on a hash of their DA and SA fields rather than by receive port. A three-bit uplink ID per packet is generated by taking a snapshot of the lower three bits of the regenerated CRC word as the packet is checked on receive. This ID is placed in the info word of the first cell of the packet.

In default uplink mode, if there is a destination address mismatch (or broadcast/multicast), then the packet may be forwarded to a higher level network thru an uplink port. The PDX will logically AND the uplink mask (which is formed by the UPLINK bit of all the ports on that PDX) with the VLAN mask for the packet (if VLANs are not enabled, the VLAN mask will be all ones). The resulting mask is used to forward the packet out the appropriate port(s).

Additionally, the PDX may be configured to have concurrent, multiple uplinks. These uplink ports would be on separate non-overlapping VLANS.

When implementing Spanning Tree and using VLANS, IEEE 802.1Q provides only for VLANs over a single spanning tree and requires that spanning tree packets are not subjected to VLAN forwarding rules. This implies that multiple redundant links would be reduced by Spanning Tree to only one. If the one enabled link was to subsequently fail, another could be re-enabled by the spanning tree.

However, since PDX supports spanning tree by forwarding STP packets to a management agent that then configures PDX ports to a particular spanning tree state, it is possible to design a PDX stack such that after the spanning tree, PDX retains multiple concurrent uplinks.

It should be noted that the use of multiple uplinks with only PDX internal VLANs may result in the VLAN segmentation being compromised, e.g., a broadcast sent out the uplink port of one VLAN will be sent back down the uplink ports of any other VLANs. As long as the PDX uplink ports are on separate non-overlapping VLANs there will not be a problem with looping. Additionally, with multiple uplinks and only PDX configured for VLANs, it is not allowed to have a downlink port be a member of more than one VLAN visible to the upper level.

If the upper level network is also configured for VLANs then VLAN segmentation need not be affected and a downlink port may be configured as belonging to more than one VLAN.

Look Up Engine

Figure 10:
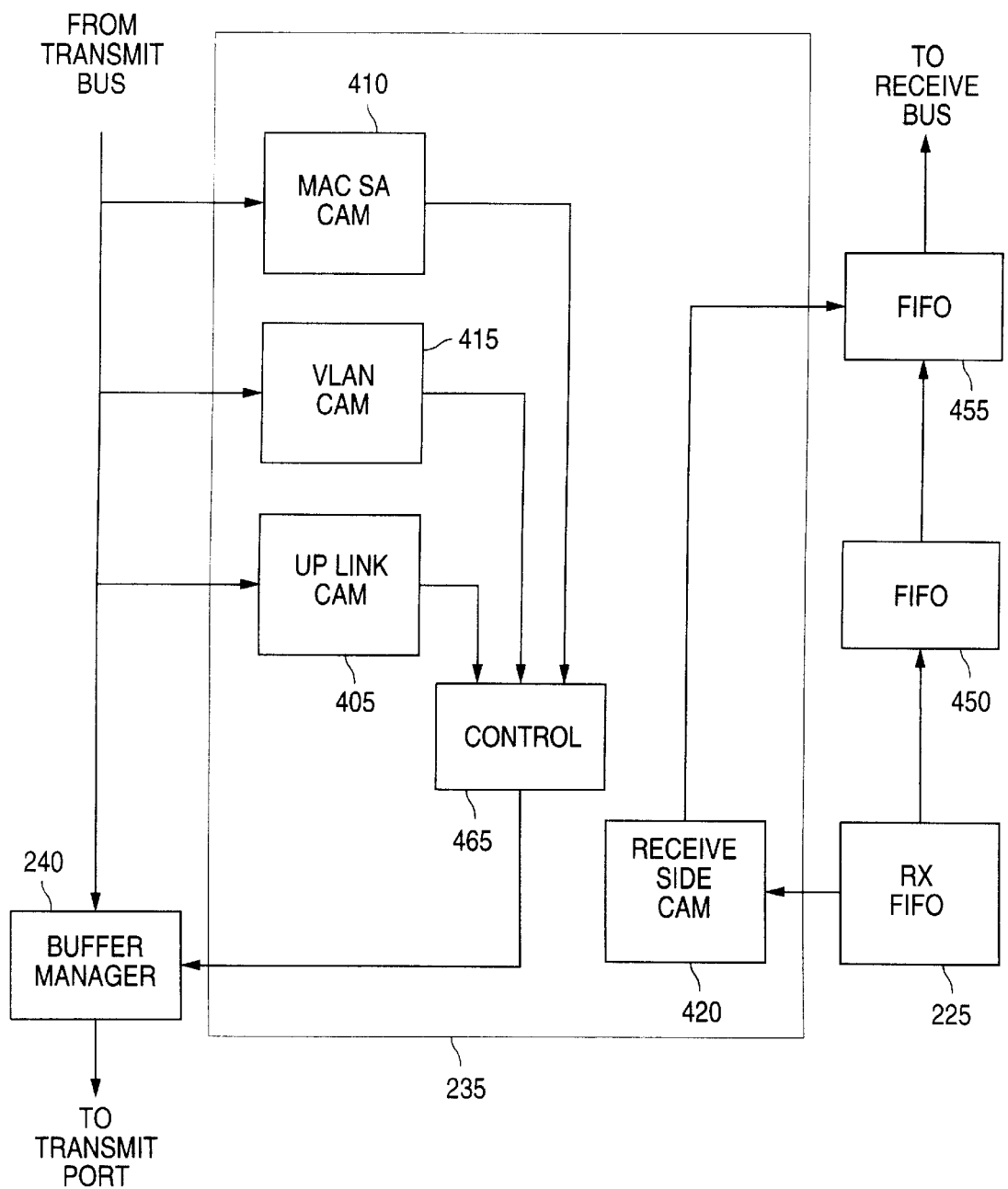
FIG. 10 is a block diagram of a look up engine in the data switch.

FIG. 10 shows the look up engine (LUE), which learns, stores, and maintains MAC address information, port information, and VLAN information which it uses in making packet forwarding decisions. The look up engine forwards or filters packets based on PDX configuration, packet type, and stored address, port and VLAN information. When the LUE determines the ports (if any) to which a given packet must be sent, it informs Transmit Buffer Manager 240 by inserting a port bitmask into the info field of the first cell of the packet.

PDX performs lookups on both the receive side and the transmit side of the switch bus using four Content Addressable Memories (CAMs), further detailed below. The PDX's lookup function uses four CAMs: (1) MAC SA CAM 410, with a port ID number tag used for forwarding unicast packets; (2) VLAN CAM 415 with port mask tag for mapping VLAN tagged packets; (3) Uplink CAM 405 with a port address tag used to determine which uplink port a packet (with unknown destination address or a broadcast) should be sent; and (4) Receive side CAM 420 with VLAN ID tag fields for implementing multicast video streams using VLANs or associating a VLAN with a particular conversion (SA/DA/TYPE). Receive Side CAM 420 corresponds to content addressable memory 110 of FIG. 1.

The CAMs allow the PDX to make forwarding decisions at the transmit side based on: (1) the destination address; (2) the VLAN tag; and (3) the uplink ID of the packet as it is received from the switch bus. All of the described CAMs have a valid tag bit. Also, an activity bit is associated with VLAN CAM 415, Receive Side CAM 420, and MAC SA CAM 410.

To support VLAN based multicast video streams, PDX can map multicast DAs to specific VLANs with Receive Side CAM 420. This CAM contains multicast addresses and VLAN tags. Lookups of this CAM are performed on the receive side of the switch bus. As a SOF cell is drained from RX FIFO 225 into Bus Access FIFO 425, a lookup is performed on the DA and the returned VLAN and priority info are used to modify the packet's VLAN ID or change the info word priority bit. This functionality may be implemented as circuit 100 of FIG. 1.

Optionally, this CAM may be used to create a VLAN association with a hash of a packet's DA, SA, and the TYPE fields. The hash word is generated by capturing a snapshot of the CRC checker in the RX port after the last bit of the SA field have been clocked into the CRC. The 32 bits rendered by this operation are padded with zeroes (or TYPE field) to create a 48-bit hash word which is inserted into the data stream and is compared to the Rx side CAM contents before being stripped as the packet goes out to the switch bus. This lookup operation returns VLAN and/or priority information which may be used to overwrite the frame's existing information. This functionality may also be implemented as circuit 100 of FIG. 1.

If desired, to preserve the ability to check the CRC across the switch bus as an error protection mechanism, the VLAN ID may only be overwritten for frames which were received without a valid VLAN ID (either untagged or tagged with a null VLAN ID). The priority status, however, may be elevated for any packet as this information is stored in the info word rather than the packet body.

In a preferred embodiment, there are 192 multicast/hash CAM locations in Receive Side CAM 420 that may be programmed to associate a given multicast address or SA/DA TYPE hash with a specific VLAN and/or priority. If a packet is received whose DA matches an address contained in the CAM, then those ports that are members of the specified VLAN will participate in the frame's transmission. Lookups of the Receive Side CAM are performed on the receive side of the switch bus by the sourcing PDX.

The FIFO 450 holds the packet until Receive Side CAM 420 has performed its lookup. The FIFO 455 holds the packet and the tag added from Receive Side CAM 420 for transmission on the receive bus interface. Control circuit 465 receives the outputs from the CAMs (other than Receive Side CAM 420) and provides the port mask, packet type, and status information to buffer manager 240.

Figure 11:
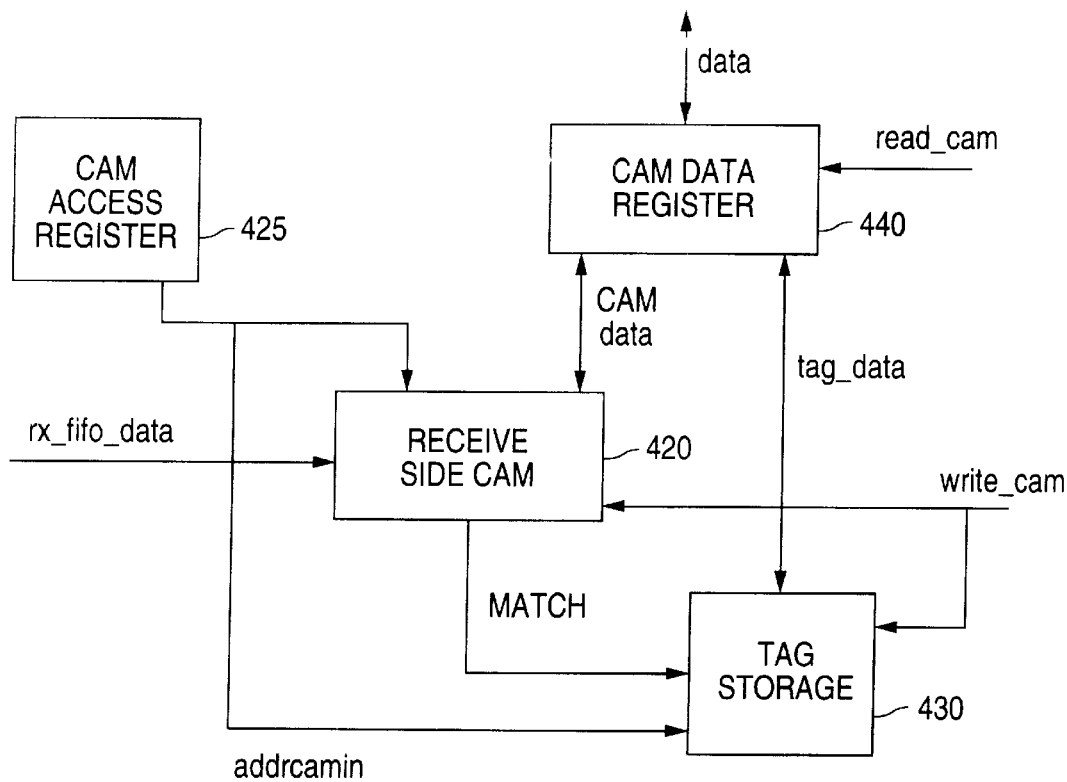
FIG. 11 is a block diagram of a preferred embodiment of the present invention.

FIG. 11 shows how Receive Side CAM 420 is accessed in a preferred embodiment, corresponding to circuit 100 in FIG. 1. Receive Side CAM 420 reads the 48-bit DA (or 48-bit hash as described above) on the rx_fifo_data signal. If there is a match, the corresponding 12-bit VLAN ID field and 1-bit priority field are transferred from tag storage 430 as a 13-bit tag data signal to CAM data register 440, along with the 48 bits from Receive Side CAM 420. The CAM data register 440 holds 192 bits. When CAM data register 440 receives a read_cam signal, it transfers its data as a 16-bit data signal.

FIG. 11 also shows how new entries are added to Receive Side CAM 420 and tag storage 430. The new 48-bit lookup data and the 13-bit tag data are stored 16 bits at a time in CAM data register 440. Upon a write_cam signal, Receive Side CAM 420 reads the 48-bit lookup data and stores it, and tag storage 430 reads the 13-bit tag data and stores it as a 12-bit VLAN ID and a 1-bit priority.

Figure 12:
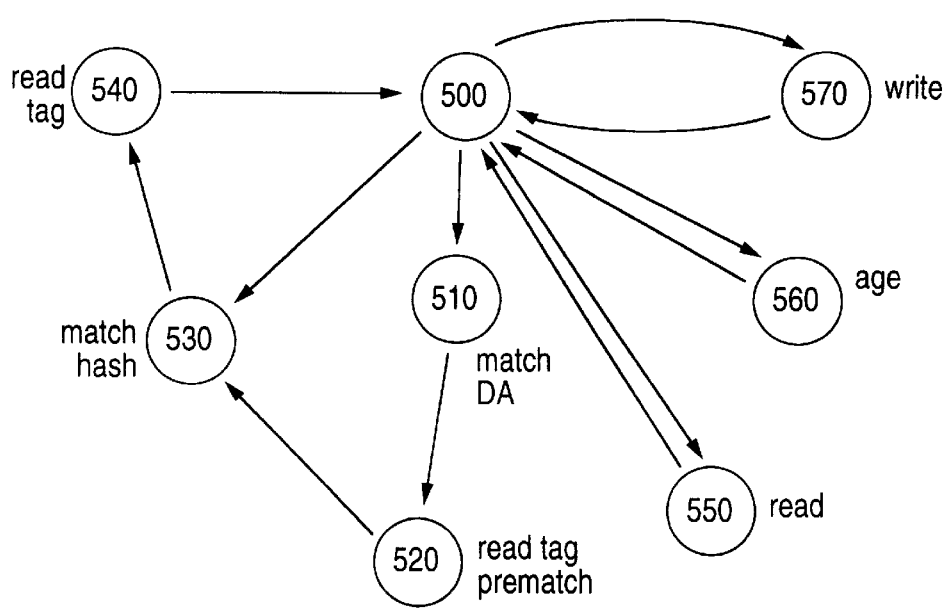
FIG. 12 is a state diagram of the states taken by the embodiment shown in FIG. 11.

FIG. 12 shows the states entered by the blocks shown in FIG. 11 when reading or writing a tag. The state machine is initially in prematch idle state 500. If it receives a rx_data_valid signal, it transitions to match DA state 510. Then, it transitions to read tag prematch state 520. While in state 520, if it receives a rx_hash_valid signal it transitions to match hash state 530; if it receives a ~rx_hash_valid signal it transitions to prematch idle state 500.

If it receives a rx_hash_valid signal while in state 500, it transitions to match hash state 530.

After state 530, it transitions to read tag state 540. Then it transitions to prematch idle state 500.

If it receives a ~wr_pending signal and a rd_pending signal and a ~lookup_pending signal while in state 500, it transitions to read state 550. It then transitions to prematch idle state 500.

If it receives an age_pending signal and a ~wr_pending signal and a ~rd_pending signal and a ~lookup pending signal while in state 500, it transitions to age state 560. It then transitions to prematch idle state 500.

If it receives a wr_pending signal and a ~rd_pending signal and a ~lookup_pending signal while in state 500, it transitions to write state 570. It then transitions to prematch idle state 500.

VLAN Support

The intent of the PDX VLAN support is to facilitate logical segmentation of a single physical network. A number of benefits accrue from this capability. Broadcast containment allows a single broadcast domain to become multiple smaller domains. Easy administration of moves/adds/changes is enabled because the new or moving host is part of a given network regardless of physical wiring. Security is improved because traffic is limited to hosts for which it is intended, making eavesdropping more difficult.

Current popular implementations of VLANs are port based and MAC based. Additionally, IEEE 802.1Q specifies a VLAN implementation based on explicit tagging of frames. This standard provides for dynamic as well as static configuration of VLANs and allows up to 4096 VLANs per network.

PDX supports port based VLANs, and both static and dynamic 802.1Q VLANs. Since PDX is designed as a desktop switch (user per port), it does not differentiate between port-based and MAC-based VLANs. PDX also supports VLAN based multicast video streams, allowing users to subscribe to a video broadcast simply by requesting membership of a VLAN. Preferably, PDX is implemented with a maximum of 192 concurrently active VLANs.

PDX is programmed to support VLANs by setting the VLAN_EN bit in the Global Configuration Register 0. The PDX may then be configured for full 802.1Q VLANs or internal port-based VLANs by setting the tag capability of each port.

802.1Q VLANs

Per the 802.1Q standard, each PDX port can be independently configured to be tagged only, untagged only, or hybrid by programming the TAG<1:0> bits of the Port Control Register 1.

Each port in the PDX will examine incoming receive frames for the existence of the 802.1Q tag in the frame. If none is present, the PDX will insert the two-byte 802.1Q tag protocol identifier and a two-byte default VLAN identifier for that port before forwarding onto the switch bus. The default tag value for the port is programmed into the Port VLAN Tag register. The tag status of the packet on receive is reflected in the RX_packet_status bits of the info word is set before sending onto the switch bus.

Depending on its configuration, the transmitting port may remove the embedded tag from a packet before transmitting to the network segment. If a port is configured as untagged then the tag will be removed. If a port is configured as hybrid the tag will be removed if the VLAN is known to be tag-unaware. This is known by means of a tag/untag bit in the VLAN CAM. By default, PDX will not discard tagged packets received on an untagged port or untagged packets on a tagged port However, PDX may be configured with this functionality by setting the DISCARD_TAG bit in the Global Configuration register 0.

PDX may also be configured to discard packets which due to tag insertion become larger than the maximum permissible Ethernet frame size (1518). This mode is invoked by setting the GIANT bit in the Global Configuration Register 0. When the receiving port inserts a tag into a frame so that the frame length exceeds 1518 bytes, the GIANT bit in the info word is set. If PDX receives a packet form the switch bus with the GIANT bit set and the GIANT bit in the Global Configuration Register 0 is also set, the Look Up Engine will discard the packet unless the destination port is configured to be untagged. If the destination port is configured to be untagged then the packet may safely be for-warded since the tag will be removed anyway before the packet is transmitted to the network.

PDX contains a 192 location look up table (VLAN CAM 415), programmable via the serial interface, of currently active VLAN tags and associated ports. Entries are only maintained for VLANs with at least one member present on the PDX stack, i.e., PDX does not seek to maintain entries for the potentially large number of VLAN IDs that may exist on the upper level network.

When a PDX receives a packet from switch bus 260, its VLAN tag is matched with the entries in VLAN CAM 415. If the packet is a broadcast/multicast (except for some special reserved addresses) and its tag is matched, then it is forwarded to ports on its VLAN only. If the packet is a unicast and PDX is configured to be in secure mode by setting the SECURE bit of the Global Configuration Register 0, then the packet will be forwarded only if there is a destination match and VLAN match returning the same port masks. Otherwise, it will be directed to the management entity (via the 13th port) for it to handle, or optionally forwarded out the uplink port.

GARP requests to a given VLAN are detected by the Look Up Engine and passed to a management entity via the 13th port. In this way, the VLAN table can be cached so as to support dynamic VLANs without storing all 4096 possible VLAN IDs. The management entity may then reconfigure the VLAN look up table. To facilitate this, each entry in the Look Up table has an activity bit which is set upon a VLAN match and may periodically be reset under management control. When the management entity determines that it needs to add a VLAN entry, it can examine the CAM for VLANs which have not been active recently (activity bit has not been set since last reset). That entry can then be overwritten with the tag and port mask for the new VLAN.

Port based VLANs

The PDX also supports Port-based VLAN implementations. The PDX internally uses the 802.1Q tagging mechanism described previously. The PDX's default port VLAN ID registers and VLAN look up table may be programmed such as to effectively configure PDX for Port-based VLANs.

Each port should be programmed to be untagged and assigned to a VLAN by programming the default VLAN ID register.

It is allowed for a node to be a member of multiple overlapping VLANS. This might be achieved by having a node associated with multiple VLANS, one of which would be a superset of the others, such that a port might send a packet on one VLAN, but receive packets on any of a number of other (different) VLANS, for example, one server with n VLANs.

When PDX is configured in Port-based VLAN mode, the tagging concept does not extend beyond the scope of the PDX stack; i.e., all ports are programmed as untagged, and no tagged packets are transmitted from the PDX.

Multicast "Video" Streams

The 192 location Receive Side CAM 420 may be used to associate multicast addresses with VLAN IDs and/or priority status, as described above and also as described regarding circuit 100. If a packet is received whose destination address matches one of the stored multicast addresses, then, before the packet is sent onto the switch bus, the VLAN tag field is overwritten with the tag associated with that multicast, rather than the default tag for the receive port. The tag is not overwritten if the packet was tagged when received. It is then sent onto switch bus 260 as normal and forwarded on the transmit section 360 according to its VLAN tag. Using this capability, PDX may be configured such that users can subscribe to a video broadcast simply by requesting membership of the relevant VLAN. Management software would then modify the CAM entry for the requested VLAN to set the bit in the port mask corresponding to that user's port.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus including a circuit for assigning a VLAN tag to a data frame received at a port of a switch, said circuit comprising:

a content addressable memory which stores tagging information, said tagging information including lookup data and associated tag data:

a data frame memory which stores at least part of a data frame, said Dart including data frame information;

a search circuit, connected to said content addressable memory and said data frame memory, which reads said data frame information, searches said content addressable memory for said lookup data corresponding to said data frame information, and reads a corresponding subset of said associated tag data; and a tagging circuit, connected to said search circuit and said data frame memory, which writes in said data frame memory a VLAN tag including said corresponding subset of said associated tag data, wherein:

said data frame information comprises an associated source address and an associated destination address;

said lookup data comprises a plurality of hashes of reference source and destination addresses; and said search circuit searches said content addressable memory for one of said Plurality of hashes corresponding to said associated source address and said associated destination address.

2. The apparatus of claim 1, wherein:

said data frame information further comprises an associated frame type;

said plurality of hashes further includes hashes of reference frame types; and said search circuit further searches said content addressable memory for said one of said plurality of hashes corresponding to said associated source address, said associated destination address, and said associated frame type.

3. The apparatus of claim 1, wherein said associated tag data includes priority data, said apparatus further comprising:

a control memory which stores an information value; and a priority circuit, connected to said search circuit and said control memory, which writes into said control memory said corresponding subset of said associated tag data.

4. The apparatus of claim 1, further comprising:

a detagging circuit, connected to said data frame memory, which removes said VLAN tag from said data frame.

5. The apparatus of claim 1, wherein:

said associated destination address corresponds to a multicast address.

6. The apparatus of claim 2, wherein:

said associated destination address corresponds to a multicast address.

7. The apparatus of claim 2, wherein said associated tag data includes priority data, said apparatus further comprising:

a control memory which stores an information value; and a priority circuit, connected to said search circuit and said control memory, which writes into said control memory said corresponding subset of said associated tag data.

8. The apparatus of claim 2, further comprising:

a detagging circuit, connected to said data frame memory, which removes said VLAN tag from said data frame.

9. A method for assigning a VLAN tag to a data frame received at a port of a switch, said method comprising the steps of:

storing at least part of a data frame, said part including an associated source address and an associated destination address;

storing tagging information, said tagging information including a plurality of hashes of reference source and destination addresses, and associated tag data;

reading said associated destination address and said associated source address;

searching said tagging information for said lookup data corresponding to said associated source address and said associated destination address;

reading a subset of said associated tag data according to a result of said step of searching: and writing in said part a VLAN tag including said subset of said associated tag data.

10. The method of claim 9, wherein:

said step of storing at least part of a data frame comprises storing at least part of a data frame, said part including an associated source address and an associated destination address corresponding to a multicast address.

11. The method of claim 9, wherein:

said step of storing at least part of a data frame comprises storing at least part of a data frame, said part including an associated source address, an associated destination address, and an associated frame type;

said step of storing tagging information comprises storing tagging information, said tagging information including a plurality of hashes of reference source and destination addresses and reference frame types, and associated tag data;

said step of reading said data frame information comprises reading said associated destination address, said associated source address, and said associated frame type; and said step of searching said tagging information comprises searching said tagging information for said lookup data corresponding to said associated source address, said associated destination address, and said associated frame type.

12. The method of claim 9, wherein said associated tag data includes priority data, further comprising the steps of:

storing an information value; and writing into said information value said subset of said associated tag data.

13. The method of claim 9, further comprising the step of:

removing said VLAN tag from said data frame.

14. The method of claim 11, wherein:

said step of storing at least part of a data frame comprises storing at least part of a data frame, said part including an associated source address, an associated frame type, and an associated destination address corresponding to a multicast address.

15. The method of claim 11, wherein said associated tag data includes priority data, further comprising the steps of:

storing an information value; and writing into said information value said subset of said associated tag data.

16. The method of claim 9, further comprising the step of:

removing said VLAN tag from said data frame.

* * * * *

UNITED STATES PATENT AND TRADEMARK OFFICE
CERTIFICATE OF CORRECTION

PATENT NO. : 6,181,699 B1
DATED : January 30, 2001
INVENTOR(S) : Patrick T. Crinion et al.

It is certified that error appears in the above-identified patent and that said Letters Patent is hereby corrected as shown below:

Column 13,
Line 65, delete ":" and replace with --;--.
Line 67, delete "Dart" and replace with -- part --.

Column 14,
Line 16, delete "Plurality" and replace with -- plurality --.

Column 15,
Line 5, delete ":" and replace with -- ; --.

Signed and Sealed this

Seventh Day of August, 2001

Attest:

NICHOLAS P. GODICI
Attesting Officer
Acting Director of the United States Patent and Trademark Office